(12) United States Patent
Hamlyn et al.

(10) Patent No.: US 8,191,596 B2
(45) Date of Patent: Jun. 5, 2012

(54) FIBER APPLICATION MACHINE COMPRISING A FLEXIBLE COMPACTING ROLLER WITH A THERMAL REGULATION SYSTEM

(75) Inventors: Alexander Hamlyn, Ploemeur (FR); Yvan Hardy, Lorient (FR)

(73) Assignee: Coriolis Composites, Lyons (FR)

( * ) Notice: Subject to any disclaimer, the term of this patent is extended or adjusted under 35 U.S.C. 154(b) by 388 days.

(21) Appl. No.: 12/628,449

(22) Filed: Dec. 1, 2009

(65) Prior Publication Data
US 2011/0011537 A1  Jan. 20, 2011

(30) Foreign Application Priority Data
Jul. 17, 2009  (FR) ...................................... 09 54963

(51) Int. Cl.
*B65H 81/00*  (2006.01)
(52) U.S. Cl. ......... 156/441; 156/433; 156/523; 156/574
(58) Field of Classification Search ................. 156/523, 156/574, 441, 433
See application file for complete search history.

(56) References Cited

U.S. PATENT DOCUMENTS

| | | | |
|---|---|---|---|
| 494,910 A | 4/1893 | Wells |
| 1,100,829 A | 6/1914 | Joseph |
| 1,164,303 A | 12/1915 | Nicewarner |
| 1,301,354 A | 4/1919 | Baird |
| 3,206,429 A | 9/1965 | Broyles et al. |
| 3,238,084 A | 3/1966 | Hawkins |
| 3,265,795 A | 8/1966 | Medney |
| 3,300,355 A | 1/1967 | Adams |
| 3,563,122 A | 2/1971 | De Neui |
| 3,662,821 A | 5/1972 | Saxon |
| 3,713,572 A | 1/1973 | Goldsworthy et al. |
| 3,856,052 A | 12/1974 | Feucht |
| 4,118,814 A | 10/1978 | Holtom |
| 4,242,160 A | 12/1980 | Pinter et al. |
| 4,351,688 A | 9/1982 | Weiss et al. |
| 4,461,669 A | 7/1984 | Dontscheff |
| 4,488,466 A | 12/1984 | Jones |
| 4,562,033 A | 12/1985 | Johnson et al. |
| 4,569,716 A | 2/1986 | Pugh |

(Continued)

FOREIGN PATENT DOCUMENTS

DE   1 922 327 U   8/1965

(Continued)

OTHER PUBLICATIONS

International Search Report for International Application No. PCT/EP2010/054337 dated Jul. 2, 2010.

(Continued)

*Primary Examiner* — Jeff Aftergut
(74) *Attorney, Agent, or Firm* — Patterson Thuente Christensen Pedersen, P.A.

(57) ABSTRACT

A fiber application machine for the production of parts made of composite materials comprising a compacting roller for applying on an application surface a band formed of at least a resin pre-impregnated flat fiber, and a heating system able to emit a heat radiation towards the band. The compacting roller comprises a rigid central tube provided with radial holes, and a cylinder made of an elastically deformable, flexible material, assembled on the central tube, and having a fluid communication assembly that brings the radial holes into fluid communication with the external surface of the cylinder. The machine includes a thermal regulation system that injects a thermal regulation fluid in the central tube internal passage.

12 Claims, 3 Drawing Sheets

U.S. PATENT DOCUMENTS

| | | | |
|---|---|---|---|
| 4,574,029 A | 3/1986 | Murray | |
| 4,699,031 A | 10/1987 | D'Angelo et al. | |
| 4,714,509 A * | 12/1987 | Gruber | 156/272.2 |
| 4,717,330 A | 1/1988 | Sarh | |
| 4,735,672 A | 4/1988 | Blad | |
| 4,849,150 A | 7/1989 | Kittaka et al. | |
| 4,881,998 A | 11/1989 | Youngkeit | |
| 4,976,012 A | 12/1990 | McConnell | |
| 4,990,213 A | 2/1991 | Brown et al. | |
| 4,992,133 A | 2/1991 | Border | |
| 4,997,513 A | 3/1991 | Lengen et al. | |
| 5,015,326 A * | 5/1991 | Frank | 156/511 |
| 5,078,592 A | 1/1992 | Grimshaw et al. | |
| 5,087,187 A | 2/1992 | Simkulak et al. | |
| 5,110,395 A | 5/1992 | Vaniglia | |
| 5,200,018 A | 4/1993 | Gill et al. | |
| 5,290,389 A | 3/1994 | Shupe et al. | |
| 5,447,586 A | 9/1995 | Tam | |
| 5,587,041 A * | 12/1996 | Sandusky et al. | 156/441 |
| 5,645,677 A | 7/1997 | Cahuzac et al. | |
| 5,700,347 A | 12/1997 | McCowin | |
| 5,766,357 A | 6/1998 | Packer et al. | |
| 6,026,883 A | 2/2000 | Hegerhorst et al. | |
| 6,073,670 A | 6/2000 | Koury | |
| 6,251,185 B1 | 6/2001 | Morrison et al. | |
| 6,256,889 B1 | 7/2001 | Zuro | |
| 6,451,152 B1 | 9/2002 | Holmes et al. | |
| 6,458,309 B1 | 10/2002 | Allen et al. | |
| 6,490,990 B1 | 12/2002 | Hamlyn et al. | |
| 6,540,000 B1 | 4/2003 | Darrieux et al. | |
| 6,605,171 B1 | 8/2003 | Debalme et al. | |
| 7,048,024 B2 | 5/2006 | Clark et al. | |
| 7,819,160 B2 | 10/2010 | Hamlyn et al. | |
| 7,926,537 B2 | 4/2011 | Hamlyn et al. | |
| 8,052,819 B2 | 11/2011 | Munaux et al. | |
| 8,057,618 B2 | 11/2011 | Hamlyn | |
| 2002/0014715 A1 | 2/2002 | Wirth et al. | |
| 2002/0090408 A1 | 7/2002 | Dahl et al. | |
| 2002/0152860 A1 | 10/2002 | Machamer | |
| 2003/0118681 A1 | 6/2003 | Dahl et al. | |
| 2004/0031879 A1 | 2/2004 | Kay et al. | |
| 2004/0079838 A1 | 4/2004 | Simpson et al. | |
| 2004/0103948 A1 | 6/2004 | Scheelen et al. | |
| 2005/0023414 A1 | 2/2005 | Braun | |
| 2005/0037195 A1 | 2/2005 | Warek | |
| 2005/0039844 A1 | 2/2005 | Engwall et al. | |
| 2005/0061422 A1 | 3/2005 | Martin | |
| 2005/0236735 A1 | 10/2005 | Oldani et al. | |
| 2006/0127635 A1 | 6/2006 | Colson et al. | |
| 2006/0162143 A1 | 7/2006 | Nelson et al. | |
| 2006/0169118 A1 | 8/2006 | Morehead | |
| 2006/0180264 A1 | 8/2006 | Kisch et al. | |
| 2006/0231682 A1 | 10/2006 | Sarh | |
| 2007/0044919 A1 | 3/2007 | Hoffmann | |
| 2007/0044922 A1 | 3/2007 | Mischler et al. | |
| 2008/0093026 A1 | 4/2008 | Naumann | |
| 2008/0105785 A1 | 5/2008 | Griess et al. | |
| 2008/0157437 A1 | 7/2008 | Nelson et al. | |
| 2008/0196825 A1 | 8/2008 | Hamlyn | |
| 2008/0202691 A1 | 8/2008 | Hamlyn et al. | |
| 2008/0216961 A1 | 9/2008 | Hamlyn et al. | |
| 2008/0216963 A1 | 9/2008 | Hamlyn et al. | |
| 2009/0229760 A1 | 9/2009 | Hamlyn et al. | |
| 2009/0311506 A1 | 12/2009 | Herbeck et al. | |
| 2010/0252183 A1 | 10/2010 | Munaux et al. | |
| 2011/0011538 A1 | 1/2011 | Hamlyn et al. | |

FOREIGN PATENT DOCUMENTS

| | | |
|---|---|---|
| DE | 37 43 485 A1 | 7/1989 |
| DE | 10 2007 009 124 A1 | 8/2008 |
| EP | 0 216 695 A1 | 4/1987 |
| EP | 0 241 251 A1 | 10/1987 |
| EP | 0 557 158 A1 | 8/1993 |
| EP | 0 753 394 A2 | 1/1997 |
| EP | 0 773 099 A1 | 5/1997 |
| EP | 0 626 252 B1 | 11/1999 |
| EP | 1 001 066 A2 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 A1 | 6/1989 |
| FR | 2 686 080 A1 | 7/1993 |
| FR | 2 721 548 A1 | 12/1995 |
| FR | 2 784 930 A1 | 4/2000 |
| FR | 2 865 156 A1 | 7/2005 |
| FR | 2 882 681 A1 | 9/2006 |
| FR | 2 913 365 A1 | 9/2008 |
| GB | 2 268 705 A | 1/1994 |
| GB | 2 270 672 A | 3/1994 |
| GB | 2 292 365 A | 2/1996 |
| JP | 01281247 | 11/1989 |
| JP | 2005-007252 | 1/2005 |
| JP | 2005329593 | 12/2005 |
| WO | WO 95/20104 | 7/1995 |
| WO | WO 02/070232 A1 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO 2008/149004 A1 | 12/2008 |
| WO | WO 2010/049424 A1 | 5/2010 |

OTHER PUBLICATIONS

Application and File History for U.S. Appl. No. 11/666,537, filed Nov. 26, 2008, inventor Hamlyn.

Application and File History for U.S. Appl. No. 11/740,055, filed Apr. 25, 2007, inventor Hamlyn.

Application and File History for U.S. Appl. No. 11/740,057, filed Apr. 25, 2007, inventor Hamlyn.

Application and File History for U.S. Appl. No. 11/740,060, filed Apr. 25, 2007, inventor Hamlyn.

Application and File History for U.S. Appl. No. 11/740,064, filed Apr. 25, 2007, inventor Hamlyn.

Application and File History for U.S. Appl. No. 12/434,253, filed May 1, 2009, inventor Munaux.

Application and File History for U.S. Appl. No. 12/628,460, filed Dec. 1, 2009, inventor Hamlyn.

File History for U.S. Appl. No. 11/666,537, filed Nov. 26, 2008.

File History for U.S. Appl. No. 11/740,055, filed Apr. 25, 2007.

File History for U.S. Appl. No. 11/740,057, filed Apr. 25, 2007.

File History for U.S. Appl. No. 11/740,060, filed Apr. 25, 2007.

File History for U.S. Appl. No. 11/740,064 filed Apr. 25, 2007.

Transaction History for U.S. Patent No. 6,490,990 Issued Dec. 10, 2002.

French Search Report dated Apr. 13, 2010 for French Application No. 09 54963.

French Search Report dated Apr. 15, 2010 for French Application No. 09 54964.

File History for U.S. Appl. No. 11/740,064, filed Apr. 25, 2007.

File History for U.S. Appl. No. 12/434,253, filed May 1, 2009.

File History for U.S. Appl. No. 12/628,460, filed Dec. 1, 2009.

Application and File History for U.S. Appl. No. 12/628,460, filed on Dec. 1, 2009, inventor Hamlyn.

* cited by examiner

FIBER APPLICATION MACHINE COMPRISING A FLEXIBLE COMPACTING ROLLER WITH A THERMAL REGULATION SYSTEM

RELATED APPLICATION

The present application claims priority to French Application No. 09 54963 filed Jul. 17, 2009, which is incorporated herein in its entirety by reference.

TECHNICAL FIELD

The present invention relates to a fiber application machine for the production of parts made of composite materials, and more particularly, such a machine comprising a fiber heating system and a heat-resistant compacting roller.

BACKGROUND ART

There have been known fiber application machines, for applying on an application surface of a male or female mold, a wide band formed of at least a ribbon-type resin pre-impregnated flat fiber, particularly carbon fibers pre-impregnated with a thermoplastic or thermosetting resin, and particularly so-called fiber placement machines for applying a wide band formed of a plurality of resin pre-impregnated fibers.

These fiber placement machines, such as described in patent document WO2006/092514 typically comprise a fiber placement head and a system for moving said fiber application head. Typically, said fiber placement head comprises a compacting roller for contacting the mold so as to apply the pre-impregnated fiber band, a guiding assembly for guiding fibers in the form of a band over said compacting roller, and a heating system for heating the pre-impregnated fibers.

The compacting roller presses the fiber band against the mold application surface, or against the fiber band or bands deposited beforehand, such that the adhesion of the deposited bands between each other is facilitated, and air trapped between the deposited bands is progressively discharged.

The heating system heats the pre-impregnated fiber band, and/or the mold or the bands already applied upstream of the compacting roller, just before the compacting of the band, so as to at least soften the resin and thus promote the adhesion of the bands between each other. Generally, the band heating system provides at least the heating of the band just before its compacting.

In order to ensure a substantially uniform compacting over the entire width of the band, the fiber placement head advantageously comprises a compacting roller able to adapt to the application surface, and preferably, a compacting roller made of a flexible material, which is elastically deformable, generally, an elastomeric material.

In the case of thermosetting resins, the pre-impregnated fibers are only heated to be softened, typically at temperatures of about 40° C. At these temperatures, an elastomeric material flexible roller may advantageously be used. After applying several layers of superimposed bands, the resulting part is vacuum hardened, through polymerization, by passing it within a furnace, generally an autoclave furnace.

In the case of thermoplastic resins, the pre-impregnated fibers have to be heated at higher temperatures, at least up to the resin melting temperature, that is, of about 200° C. for nylon type resins, and of about 400° C. for PEEK type resins. A hardening operation, called consolidation operation, of the resulting part is advantageously carried out thereafter by passing it within a furnace.

The heating carried out during the application of the band may be implemented through a laser type heating system so as to obtain a concentrated and sharp heating. Owing to the high heating temperatures, the fiber placement heads are provided with heat resistant metallic compacting rollers which may also be cooled from inside via a waterway.

To adapt to the profile of the application surface, there have been proposed segmented metallic compacting rollers, comprising several independent roller segments mounted abreast on a same axis, each segment being independently and radially movable, and being elastically biased against the application surface. Nevertheless, the structure of such segmented metallic rollers and their implementation proved to be complex.

Flexible rollers formed from a so called high temperature elastomeric material, including a heat stabilizer, have also been tested. Nevertheless, theses rollers proved to be unsatisfactory for the implementation of thermoplastic resins.

To make it possible to use a flexible roller at the operating temperatures of the thermoplastic resins, there has been proposed, notably in patent document FR 2 878 779, a head provided with two compacting rollers with a heating system acting between both rollers and outputting a heat radiation substantially perpendicular to the band, between both rollers. Such a dual roller head exhibits a greater encumbrance inhibiting fiber deposition on certain application surface profiles. Moreover, the heating of the bands deposited beforehand for their adhesion through welding to the newly applied band is only made through thermal conduction, which constitutes a restrictive factor for the fiber application speed.

SUMMARY OF THE INVENTION

The present invention is aimed to provide a solution overcoming the aforementioned drawbacks, particularly making it possible to implement a wide variety of resins, ranging from thermosetting to thermoplastic ones, with a substantially uniform compacting of the applied band and which can be designed and made easily.

To this end, an embodiment of the present invention is a fiber application machine for the production of parts made of composite materials comprising:
  a compacting roller for applying on an application surface a band formed of at least a resin pre-impregnated flat fiber, preferably formed of a plurality of resin pre-impregnated flat fibers, the compacting roller comprising a rigid central tube whereby the roller is rotationally mounted on a support structure of the machine, and a cylinder made of an elastically deformable, flexible or non-rigid material, coaxially assembled on the central tube; and
  a heating system adapted to emit a heat radiation towards the band, just before the compacting thereof by the compacting roller;
  the central tube being provided with radial holes, the flexible material cylinder having a fluid communication system adapted to establish fluid communication between the radial holes and the external surface of the cylinder, the machine comprising a thermal regulation system adapted to inject a thermal regulation fluid, preferably gaseous, in the internal passage of the central tube.

According to an embodiment of the invention, the machine comprises a flexible compacting roller thermally regulated by a thermal regulation system by circulation of a thermal regulation fluid. The thermal regulation system comprises:

holes made in the tubular wall of the central tube, traversing it from end to end, the central tube being for example metallic and/or of cylindrical cross-section, a fluid communication assembly adapted to provide at the flexible material cylinder the circulation of a thermal regulation fluid through the cylinder, from the radial holes towards the external surface of the cylinder, and a thermal regulation system adapted to inject a thermal regulation fluid, preferably gaseous, advantageously a cooled or room temperature gas, particularly air, within the internal passage of the central tube from at least one end thereof, the thermal regulation fluid passes through the radial holes, traverses the flexible material cylinder to reach its external surface.

In the case of a thermal regulation fluid at room temperature, at, for example, between 15° C. and 30° C., or cooled at a temperature lower than 15° C., the circulation of the thermal regulation fluid in the compacting roller makes it possible to cool the compacting roller on the surface, as well as over the thickness of the flexible material cylinder and thus makes it possible to use a stable, flexible material compacting roller which can be used for the application of fibers pre-impregnated with resins, particularly, thermoplastic resins. The machine according to the invention, which comprises a compacting roller of simple design, makes it possible to use a wide variety of thermosetting or thermoplastic resins in combination with a wide range of synthetic or natural, hybrid or non-hybrid fibers, particularly, fibers usually used in the composite field, such as glass fibers, carbon, quartz, and aramid fibers.

The fluid communication can be adapted to establish a fluid communication between the external surface of the cylinder and the lateral sides of the compacting roller, so as to discharge to the outside the thermal regulation fluid at least laterally during the operation of the machine.

According to one embodiment, the fluid communication system includes radial channels, each radial channel opening onto a radial hole of the central tube and onto the cylinder external surface. The radial holes are distributed over the cylindrical wall of the central tube. For example, the central tube exhibits several sets of holes offset in the longitudinal direction along the axis of the compacting roller, each set comprising a plurality of holes made at regular angular intervals.

According to one embodiment, the fluid communication system includes longitudinal grooves opening onto the cylinder lateral sides, the radial channels opening onto the longitudinal grooves. So as to achieve a better distribution of the thermal regulation fluid flux on the external surface, the fluid communication system advantageously includes circular grooves onto which the radial channels open.

According to one embodiment, the fluid communication system includes the porous nature of the material constituting the cylinder, the fluid communication system then comprising a cylinder made of an elastically deformable, porous flexible material such as an open cells elastomeric and/or thermoplastic cellular foam, or a material made of non-woven fibers, such as synthetic fibers, glass fibers or metallic fibers, preferably an open cell-type elastomeric foam. In this case, the discharge of the thermal regulation fluid takes place through the lateral sides of the cylinder.

According to one embodiment, the fluid communication system comprises a sheath covering the external surface of the cylinder, the sheath being made of a porous material, thus making it possible to discharge the thermal regulation fluid by the lateral sides of the sheath. The porous material is made, for example, of an open cell-type thermoplastic and/or elastomeric foam, or a non-woven fiber material. The porous material of the sheath is elastically deformable so as to conform to the cylinder deformation during the fiber application, but exhibits a lower elasticity than that of the flexible, and possibly porous, material constituting the cylinder so as to allow for the discharging of the thermal regulation fluid.

According to one embodiment, the roller comprises a shielding sheath covering the cylinder and forming a shield against the heat radiation emitted by the heating system, the shielding sheath being formed, for example, from a glass fiber fabric.

This shielding sheath makes it possible to avoid the heat build-up of the compacting roller over the entire thickness thereof owing to the heat radiation of the heating system directed towards the compacting roller. This shielding sheath absorbs and/or reflects the heat radiation, the thermal regulation fluid thus serving for the cooling of this shielding sheath so as to avoid a heat build-up, by conduction, of the cylinder.

In the case of fiber placement, the machine typically includes a cutting assembly making it possible to individually cut the fibers upstream of the compacting roller and rerouting assembly, disposed upstream of the cutting means, for rerouting each fiber that has just been cut towards the compacting roller so as to be able to stop and resume the band application at any time, as well as varying the applied band width. When the width of the applied band is reduced, for example, of only 10 fibers for a 16 or 32 fibers-type placement head, the roller directly receives the heat radiation, with no fibers interposed between the heat source and the roller. The shielding sheath makes it possible to avoid the high heat build-up due to this direct heat radiation.

According to one embodiment, as an alternative to the shielding sheath, or in combination therewith, the cylinder is made of a material substantially transparent to the heat radiation such as described in the French patent application 09 54964 filed by the applicant, on the same day as the French priority date of the present application, and entitled "Fiber application machine with compacting roller transparent to the radiation of the heating system", and filed in the United States with application Ser. No. 12/628,460, on the same date as the present application, incorporated herein by reference. In this specification, material "substantially transparent to heat radiation" means a material exhibiting a low absorbance in the wavelength or wavelengths of the heat radiation. According to one embodiment, the flexible material is an elastomeric material. Preferably, the flexible material is a silicone or polysiloxane, or polyurethane, preferably a silicone. The heating system can emit infrared radiation having a wavelength between 780 nm and 1500 nm; the elastically deformable material presents a low absorbance at least in this wavelength range of between 780 nm and 1500 nm. Preferably, the heating system emits an infrared radiation of wavelength between 850 nm and 1100 nm.

According to one embodiment, the compacting roller comprises an anti-adherent external layer coating said flexible material cylinder, when the roller comprises a sheath made of a porous material, and/or a shielding sheath, the latter being interposed between the cylinder and the anti-adherent external layer, the anti-adherent external layer being advantageously formed of an anti-adherent film, such as a PTFE (polytetrafluoroethylene) film, which is for example thermally retracted on the cylinder. PTFE is well known by the DuPont brand name Teflon®. In this case also, the thermal regulation fluid regulates the temperature of the anti-adherent external layer.

According to one embodiment, the heating system is a laser-type system, particularly laser diode type, a YAG laser type or a fiber laser type. Alternatively, the heating system may comprise one or more infrared lamps.

According to one embodiment, the machine further comprises thermal regulation system adapted to output a thermal regulation fluid flux, particularly air, towards the compacting roller so as to regulate the temperature of said compacting roller, and in particular to cool the compacting roller, from the outside. In this case, the thermal regulation of the roller is carried out from inside the roller and from outside the compacting roller, preferably, with a same thermal regulation fluid, preferably air.

According to one embodiment, said thermal regulation means are able to inject a thermal regulation fluid at room temperature, preferably between 15° C. and 30° C., or a thermal regulation fluid cooled at a temperature lower than 15° C., preferably a cooled or room temperature gas, preferably, air at room temperature, so as to cool the compacting roller.

The present invention is also aimed to provide a compacting roller such as is described above, for a fiber application machine, comprising a rigid central tube made of an elastically deformable, flexible or non-rigid material, assembled on the central tube, and particularly characterized in that the central tube is provided with radial holes, the flexible material cylinder having a fluid communication system able to bring the holes into fluid communication with the external surface of said cylinder.

BRIEF DESCRIPTION OF THE DRAWINGS

The invention will be better understood, and other aims, details, features and advantages will become more apparent from the following detailed explanatory description of currently preferred particular embodiments of the invention, with reference to the accompanying schematic drawings in which.

DETAILED DESCRIPTION

Figure 1:
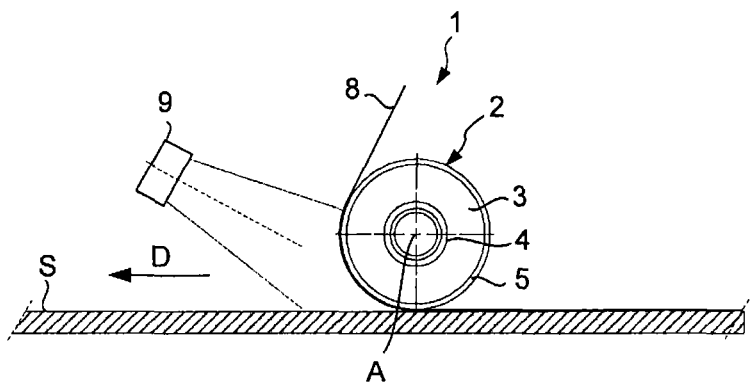
FIG. 1 is a schematic side view of a fiber application head according to a first embodiment of the invention, comprising a compacting roller and a heating system.

With reference to FIG. 1, the fiber application machine comprises an application head 1 for applying a band 8 of resin pre-impregnated fibers, said head including a compacting roller 2 which is rotationally mounted about an axis A on a support structure (not shown) of the head, the head being mounted by said support structure at the end of a moving system, for example, a robot wrist-joint.

The head further comprises a heating system 9 also mounted on the support structure upstream of the roller with regard to the progress direction D of the application head during the application of fiber band 8 on an application surface S. For example, the heating device is a laser type heating system, of which radiation is directed towards the band, just before the compacting thereof, as well as towards the band or bands deposited beforehand. As illustrated in FIG. 1, the radiation is thus obliquely directed towards the roller so as to heat a band section disposed on the roller, before the compacting thereof by the roller.

In the case of a fiber placement machine, the head comprises a guiding assembly for guiding the fibers incoming into the head towards the compacting roller 2 in the form of a band of resin pre-impregnated fibers, the fibers of the band being disposed abreast in a substantially butt-jointed fashion. By moving the head via the robot, the compacting roller is brought into contact with the application surface S of a mold for applying the band.

Figure 2:
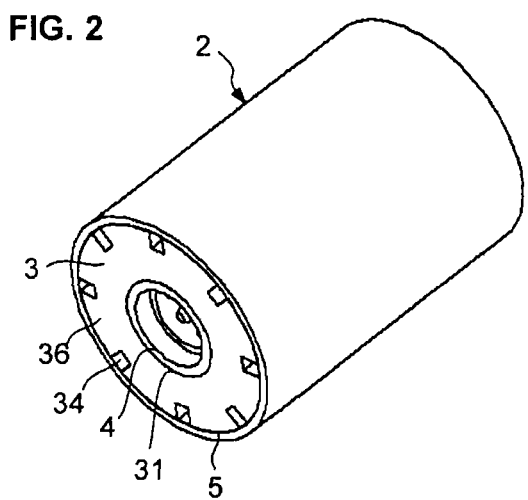
FIG. 2 is a perspective view of the compacting roller of the machine of FIG. 1.
Figure 3A:
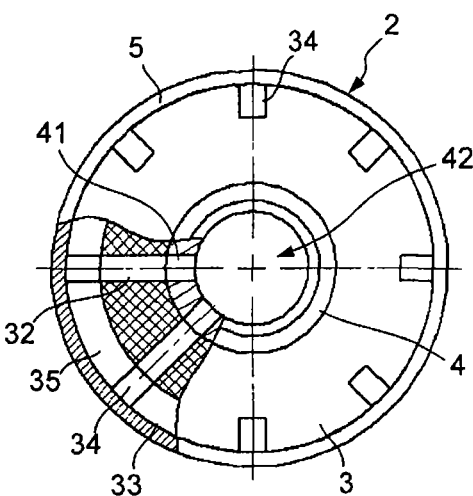
FIGS. 3A and 3B are transversal and longitudinal side views, with partial cut-out, of the compacting roller of FIG. 2.
Figure 3B:
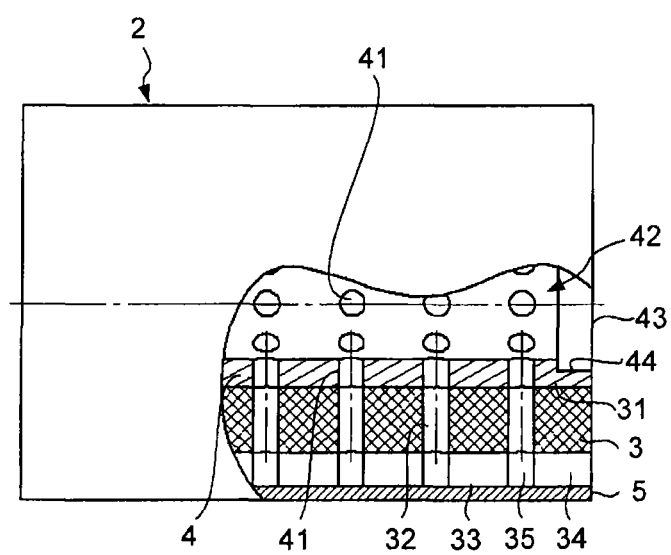

With reference to FIGS. 2, 3A and 3B, the compacting roller according to an embodiment of the invention comprises a cylindrical body or cylinder 3 made of a flexible material, elastically deformable by compression. The cylinder exhibits a cylindrical central passage 31 for its assembly on a support core formed of a cylindrical rigid central tube 4, for example, a metallic tube, such as in aluminum. Cylinder 3 and central tube 4 are coaxial to each other and rotate integrally with each other. For example, the cylinder is composed of a non-expanded elastomeric material, such as silicone, polysiloxane or polyurethane.

The flexible material cylinder allows the compacting roller to adapt to the application surface curvature variations and to thus apply a substantially uniform pressure on the entire deposited band. The rigid tube makes it possible to rotationally mount the roller on the support structure.

The central tube is provided with radial holes 41, for example, cylindrical holes, traversing the cylindrical wall of the central tube from end to end. Thus, the radial holes open onto central tube internal passage 42 and onto the cylinder. The cylinder is provided with radial channels 32, aligned with the radial holes, and of which diameters are substantially identical to those of said radial holes. In the illustrated example, the central tube comprises six sets of radial holes 41 longitudinally offset along axis A of the roller, each set comprising a plurality of radial holes disposed at regular angular intervals, for example, eight radial holes spaced apart by 45° from each other. The cylinder then comprises six sets of radial channels 32 each comprising eight radial channels spaced apart by 45° from each other.

Each radial channel 32 opens onto the cylindrical external surface 33 of cylinder 3, at the intersection of a longitudinal groove 34 and a circular groove 35. The longitudinal grooves 34, in the case of eight grooves, extend over the entire length of the cylinder from one lateral side 36 of the cylinder to the other.

Externally, the cylinder is coated with an anti-adherent external layer 5, formed here of a PTFE film thermally retracted on the external surface of the cylinder. The PTFE film thereby covers the longitudinal grooves and the circular grooves made on the cylinder external surface. The PTFE film through which the roller contacts the band, restricts the adherence of the roller to the fibers as well as the fouling of the roller.

The compacting roller is mounted by the open ends 43 of its central tube, for example, between two flanges of the head support structure. The machine comprises a thermal regulation system (not shown), which enables the injection of a gas at room temperature, between 15 and 30° C., or a gas cooled at to a temperature lower than 15° C., particularly air, from one open end 43 of central tube. This air injection is carried out by means of a conventional swing joint system. The central tube advantageously has a spot facing 44 for mounting the swing joint system. In operation, the air injected from at least one open end 43 of central tube, passes within the radial holes 41 then the cylinder radial channels 32 to distribute in the circular and longitudinal grooves 35 and 34, and leak from the lateral sides 36 of the cylinder onto which the longitudinal grooves open. Advantageously, the thermal regulation fluid is cooled air or air at room temperature, preferably air at room temperature, so as to cool the compacting roller and keep it at a temperature of about 30° C.

Alternatively, the cylinder may be made of a flexible material, substantially transparent to the radiation emitted from the heating system.

For example, the flexible material substantially transparent to heat radiation is a silicone-type elastomeric material, particularly silicone elastomer sold by Dow Corning under the commercial denomination Silastic T-4.

The laser-type heating system may comprise laser diodes, disposed in one or more rows, emitting a radiation presenting a wavelength of between 880 and 1300 nm, for example, an optical fiber laser or YAG laser, emitting at a wavelength of about 1060 nm.

To complete the thermal regulation of the roller from the inside, the thermal regulation system may further comprise a thermal regulation system able to output an air flux, towards the compacting roller, so as to also cool the compacting roller from outside.

Figure 4:
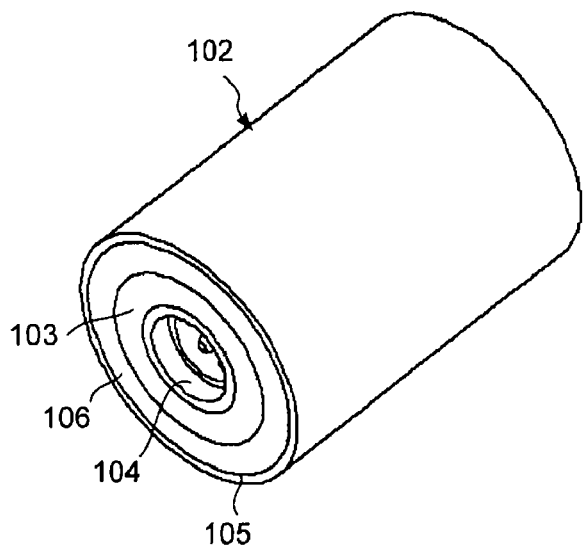
FIG. 4 is a perspective view of a compacting roller of a machine according to a second embodiment.
Figure 5A:
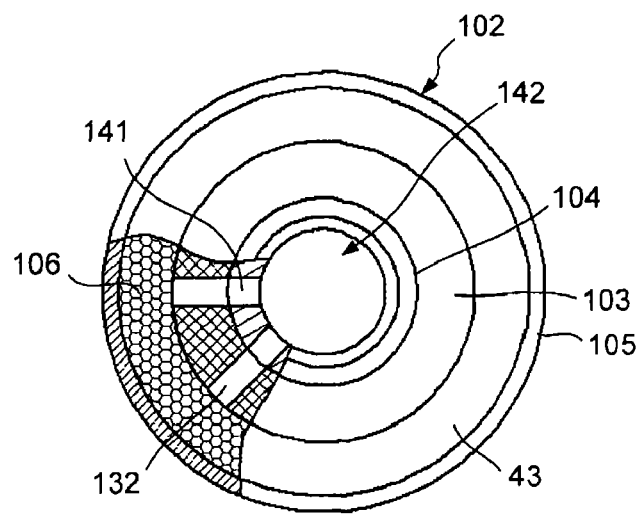
FIGS. 5A and 5B are transversal and longitudinal side views, with partial cut-out, of the compacting roller of FIG. 4.
Figure 5B:
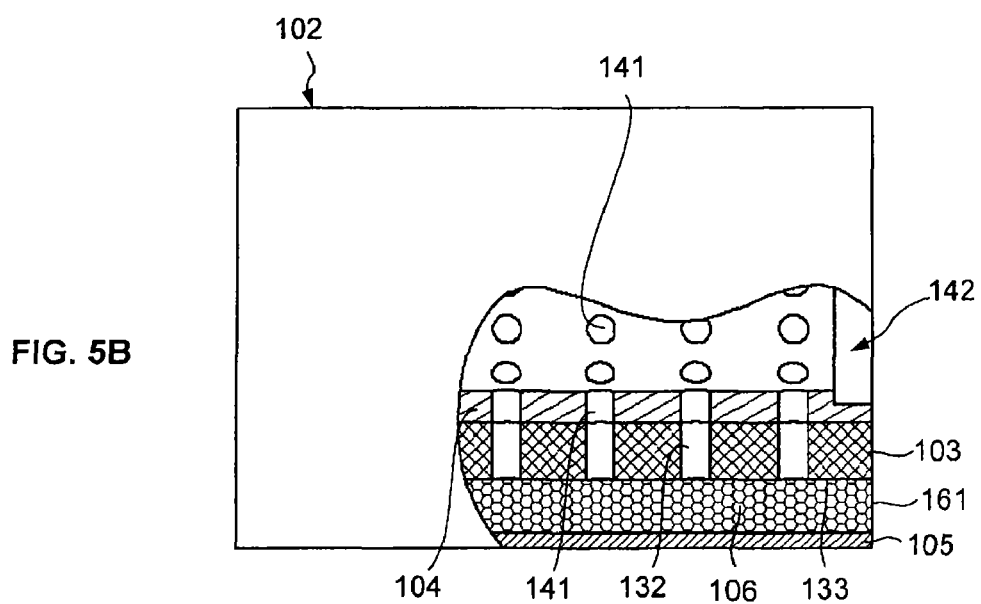

FIGS. 4, 5A, and 5B illustrate a second embodiment of the invention in which the compacting roller 102 comprises, as previously, a rigid central tube 104 provided with radial holes 141, a cylinder 103 made of a flexible, elastically deformable material, provided with radial channels 132. In this example, the circular longitudinal grooves described above, intended to enhance the distribution of the air flux injected on the cylinder surface and its leaking from the lateral sides of the cylinder, are replaced by a sheath 106 covering the cylinder external surface 133, the sheath being made of a porous material, such as an open-cell type thermoplastic and/or elastomeric foam, or a material made of non woven fibers. This porous material exhibits elasticity so as to conform to the cylinder deformation during the pressing of the roller against the application surface. An anti-adherent external sheath 105 covers the porous material sheath. After passing within the internal passage 142 and the radial holes 141 of central tube 104, then in the cylinder radial channels 132, the injected air passes through the porous material sheath and leaks laterally from the lateral sides 161 of the sheath.

Figure 6:
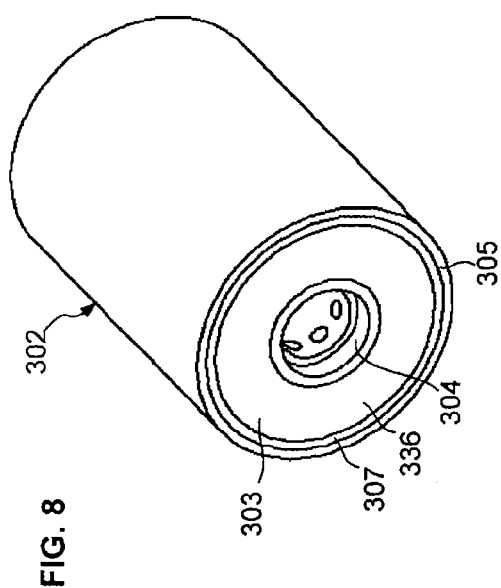
FIG. 6 is a perspective view of a compacting roller of a machine according to a third embodiment.
Figure 8:
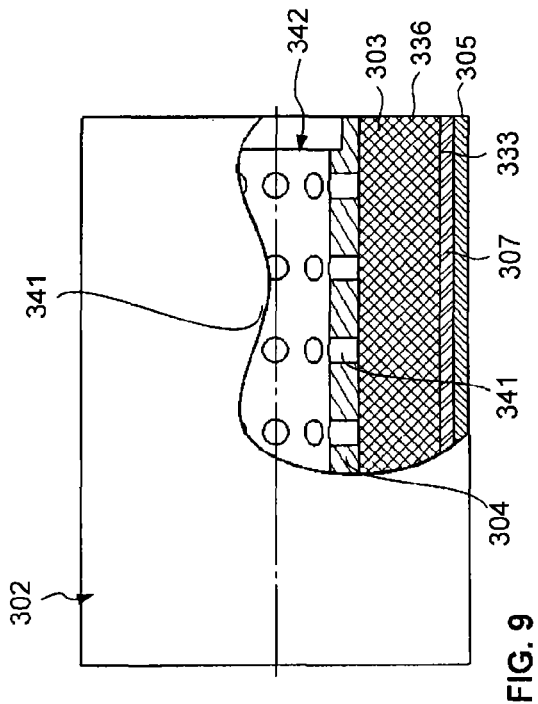
FIG. 8 is a perspective view of a compacting roller of a machine according to a fourth embodiment.
Figure 7:
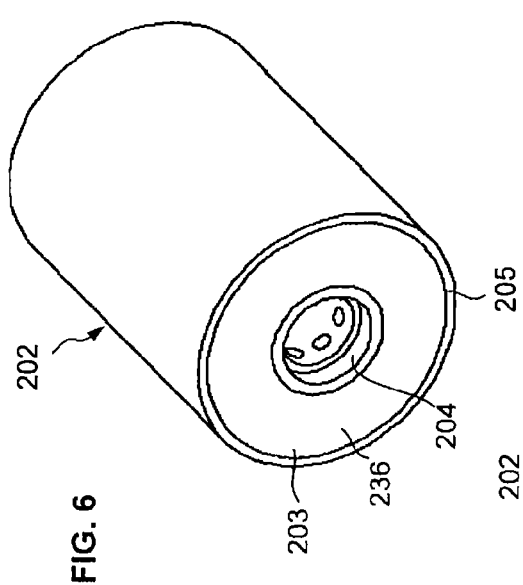
FIG. 7 is a longitudinal side view of the compacting roller of FIG. 6 with partial cut-out.
Figure 9:
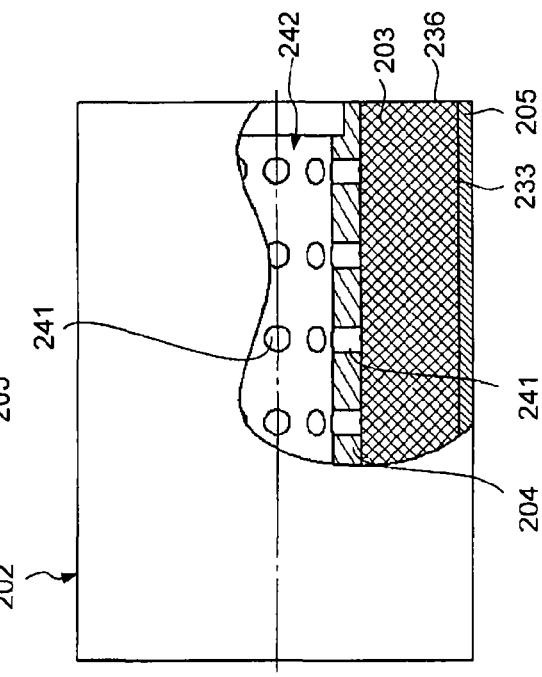
FIG. 9 is a longitudinal side view, with partial cut-out, of the compacting roller if FIG. 8.

FIGS. 6 and 7 illustrate a third embodiment of the invention in which the compacting roller 202 comprises, as in the first embodiment, a rigid central tube 204 provided with radial holes 241, an elastically deformable, flexible material cylinder 203, and an anti-adherent external sheath 205 covering the cylinder external surface 233. In this embodiment, the cylinder is not provided with radial channels, but constituted by a porous, flexible, elastically deformable material. The injected air, which exits from the internal passage 242 of central tube 204 through the radial holes 241, traverses the entire porous cylinder and leaks from the cylinder lateral sides 236. The flexible porous material is an open-cell type thermoplastic and/or elastomeric foam, or a material made of non woven fibers, for example, an open-cell type elastomeric foam.

FIGS. 6 and 7 illustrate a fourth embodiment of the invention in which the compacting roller 302 comprises, as in the third embodiment, a rigid central tube 304 provided with radial holes 341, a cylinder 303 made of a porous, flexible, elastically deformable material, and an anti-adherent external sheath 305 covering the cylinder. The compacting roller further comprises a shielding sheath 307 interposed between the cylinder external surface 333 and the anti-adherent external sheath. This shielding sheath absorbs and/or reflects the heat radiation emitted by the heating system 9 such that the heat radiation does not reach the flexible material cylinder. The injected air, exiting from internal passage 342 of central tube 304 through radial holes 341, traverses the entire cylinder so as to cool the shielding band and leaks by the cylinder lateral sides 336.

Although the invention has been described in connection with particular embodiments, it is to be understood that it is in no way limited thereto and that it includes all the technical equivalents of the described means as well as the combinations thereof should these fall within the scope of the invention. In the described embodiment, the thermal regulation system is used to cool the flexible compacting roller. The thermal regulation system may understandably be used to heat the flexible compacting roller.

The invention claimed is:

1. A fiber application machine for the production of parts made of composite materials comprising a compacting roller for applying, on an application surface, a band formed of at least one resin pre-impregnated flat fiber, and a heating system adapted to emit heat radiation directed towards the band, said compacting roller comprising a rigid central tube, and a cylinder made of an elastically deformable, flexible material, assembled on said central tube,
   said central tube being provided with radial holes, said flexible material cylinder having fluid communication means adapted to bring said radial holes into fluid communication with the external surface of said cylinder, said machine comprising thermal regulation means able to inject a thermal regulation fluid in the internal passage of the central tube.

2. The fiber application machine according to claim 1, said fluid communication means adapted to bring said cylinder external surface into fluid communication with the lateral sides of the compacting roller.

3. The fiber application machine according to claim 1, said fluid communication means comprising radial channels, each radial channel opening onto a radial hole of the central tube and onto the external surface of the cylinder.

4. The fiber application machine according to claim 3, said fluid communication means comprising longitudinal grooves opening onto the cylinder lateral sides, said radial channels opening onto said longitudinal grooves.

5. The fiber application machine according to claim 3, said fluid communication means comprising circular grooves onto which said radial channels open.

6. The fiber application machine according to claim 1, said fluid communication means comprising a cylinder made of a porous, flexible material.

7. The fiber application machine according to claim 1, said fluid communication means comprising a sheath covering the cylinder external surface, said sheath being made of a porous material.

8. The fiber application machine according to claim 1, said roller comprising a shielding sheath covering said cylinder and forming a shield against heat radiation emitted by the heating system.

9. The fiber application machine according to claim 1, said cylinder being made of a material substantially transparent to said heat radiation.

10. The fiber application machine according to claims 1, said compacting roller comprising an anti-adherent external layer coating said flexible material cylinder.

11. The fiber application machine according to claims 1, it further comprising thermal regulation means able to output a thermal regulation fluid flux directed towards the compacting roller, so as to regulate the temperature of said compacting roller from outside.

12. The fiber application machine according to claim 1, said thermal regulation means adapted to inject a thermal regulation fluid comprising air at room temperature between 15° C. and 30° C.

\* \* \* \* \*